US009427722B2

(12) United States Patent
Weston et al.

(10) Patent No.: US 9,427,722 B2
(45) Date of Patent: Aug. 30, 2016

(54) METAL-ORGANIC FRAMEWORKS FOR OXYGEN STORAGE AND AIR SEPARATION

(71) Applicant: NUMAT TECHNOLOGIES, INC., Skokie, IL (US)

(72) Inventors: Mitchell Hugh Weston, Chicago, IL (US); Patrick Fuller, Chicago, IL (US); Paul Wai-Man Siu, Evanston, IL (US)

(73) Assignee: NUMAT TECHNOLOGIES, INC., Skokie, IL (US)

( * ) Notice: Subject to any disclaimer, the term of this patent is extended or adjusted under 35 U.S.C. 154(b) by 69 days.

(21) Appl. No.: 14/515,900

(22) Filed: Oct. 16, 2014

(65) Prior Publication Data

US 2015/0105250 A1   Apr. 16, 2015

Related U.S. Application Data

(60) Provisional application No. 61/891,672, filed on Oct. 16, 2013.

(51) Int. Cl.
*B01D 53/047* (2006.01)
*B01J 20/22* (2006.01)
*B01J 20/28* (2006.01)
*B01D 53/02* (2006.01)

(52) U.S. Cl.
CPC .............. *B01J 20/223* (2013.01); *B01D 53/02* (2013.01); *B01D 53/047* (2013.01); *B01J 20/226* (2013.01); *B01J 20/2803* (2013.01); *B01J 20/2808* (2013.01); *B01J 20/28066* (2013.01); *B01J 20/28069* (2013.01); *B01J 20/28076* (2013.01); *B01D 2253/204* (2013.01); *B01D 2256/10* (2013.01); *B01D 2256/12* (2013.01); *B01D 2256/18* (2013.01); *B01D 2259/4525* (2013.01)

(58) Field of Classification Search
CPC ................ B01D 53/02; B01D 53/047; B01D 2253/204; B01D 2256/10; B01D 2256/12; B01D 2256/18; B01D 2259/4525; B01J 20/223; B01J 20/226; B01J 20/2803; B01J 20/28066; B01J 20/28069; B01J 20/28076; B01J 20/2808
USPC ................ 95/130, 138, 96; 423/219, 239.1; 206/0.7
See application file for complete search history.

(56) References Cited

U.S. PATENT DOCUMENTS

| 3,979,330 A | 9/1976 | Munzner et al. |
| 5,417,957 A | 5/1995 | Coe et al. |
| 5,945,079 A | 8/1999 | Mullhaupt et al. |
| 6,361,584 B1 * | 3/2002 | Stevens ................ B01D 53/047 95/138 |
| 6,656,878 B2 | 12/2003 | Chang |

(Continued)

FOREIGN PATENT DOCUMENTS

WO   WO 2012/122233 A2   9/2012

OTHER PUBLICATIONS

International Search Report and Written Opinion received in connection with international application No. PCT/US2014/060862, mailed Jan. 20, 2015.

(Continued)

*Primary Examiner* — Frank Lawrence
(74) *Attorney, Agent, or Firm* — The Marbury Law Group PLLC

(57) ABSTRACT

Adsorption systems providing a capacity of at least 200 g/L for oxygen-containing mixtures, or an oxygen-nitrogen selectivity of at least 1.4:1 or at least 1:2 with an adsorbed capacity of at least 0.6 mmol/g at 4 bar and 22° C.

20 Claims, 7 Drawing Sheets

(56) References Cited

U.S. PATENT DOCUMENTS

| | | |
|---|---|---|
| 8,268,048 B2 | 9/2012 | Subramaniam et al. |
| 2001/0003950 A1 | 6/2001 | Zhang et al. |
| 2002/0134240 A1 | 9/2002 | Zhong et al. |
| 2011/0165476 A1* | 7/2011 | Pulskamp ............. H01M 12/06 429/405 |
| 2013/0139686 A1* | 6/2013 | Wilmer ................. B01J 20/223 95/127 |

OTHER PUBLICATIONS

Bloch et al., "Hydrocarbon Separations in a Metal-organic Framework with Open Iron(II) Coordination Sites", *Science*, 2012, 335, 1606.

Cavka et al., "A New Zirconium Inorganic Building Brick Forming Metal Organic Frameworks with Exceptional Stability". *J. Am. Chem. Soc.* 2008, 130, 13850.

Chae et al., "A route to high surface area, porosity and inclusion of large molecules in crystals", Nature, vol. 427, pp. 523-527, (2004).

Chui et al., "A Chemically Functionalizable Nanoporous Material [$Cu_3(TMA)_2(H2O)_3]_n$". *Science*, 1999, 283, 1148.

Dietzel, P. D. C. et al. "An In Situ High-Temperature Single-Crystal Investigation of a Dehydtraed Metal-Organic Framework Compound and Field-Induced Magnetization of One-Dimensional Metal-Oxygen Chains", *Angew. Chem. Int. Ed.* 2005, 44, 6354.

Dietzel, P. D. C. et al. "Hydrogen Adsorption in a Nickel Based Coordination Polymer with Open Metal Sites in the Cylindrical Cavities of the Desolvated Framework", *Chem. Commun.* 2006, 959.

Farha et al., "De Novo Synthesis of a Metal-Organic Framework Material Featuring Ultra-High Surface Area and Extraordinary Gas Storage Capacities," *Nature Chem.*, 2, 2010, 944-948.

Farha et al., "Metal-Organic Framework Materials with Ultrahigh Surface Areas: Is the Sky the Limit?", J. Am. Chem. Soc., 2012, vol. 134, pp. 15016-15021.

Farha, O. K. et al. "Designing Higher Surface Area Metal-organic Frameworks: Are Triple Bonds Better Than Phenyls?" *J. Am. Soc. Chem.* 2012, 134, 9860.

Ferey, G. et al., "A chromium terephthalate-based solid with unusually large pore volumes and surface area", Science 2005, vol. 309, 2040.

Ferey, G., "Hybrid porous solids: past, present, future", Chem Soc. Rev. 2008, 37, 191-214.

Furukawa et al., "Ultrahigh Porosity in Metal-Organic Frameworks", Science, vol. 329, pp. 424-428 (2010).

Li et al., "Design and synthesis of an exceptionally stable and highly porous metal-organic framework", *Nature* 1999, 402, 276-279.

Nelson et al., "Supercritical Processing as a Route to High Internal Surface Areas and Permanent Microporosity in Metal-Organic Framework Materials," *J. Am. Chem. Soc.*, 2009, 131, 458-460.

Wilmer et al., "Large-scale screening of hypothetical metal-organic frameworks", *Nature Chem.* 2012, 4, 83-89.

Wilmer et al., "Structure-property relationships of porous materials for carbon dioxide separation and capture", Energy Env. Sci., 2012, 5, 9849.

Wilmer et al. "Gram-scale, High-yield Synthesis of a Robust Metal-Organic Framework for Storing Methane and Other Gases", *Energy Env. Sci.* 2013, 6, 1158.

* cited by examiner

Prior Art

FIG. 8

METAL-ORGANIC FRAMEWORKS FOR OXYGEN STORAGE AND AIR SEPARATION

RELATED APPLICATIONS

This application claims the benefit of U.S. Provisional Application No. 61/891,672, filed Oct. 16, 2013, hereby incorporated by reference in its entirety.

FIELD

The present invention relates to adsorption systems for the storage of oxygen and the separation of air components at ambient temperature. In particular, it relates to systems containing metal-organic frameworks that exhibit high capacity or equilibrium selectivity for oxygen or nitrogen at room temperature.

BACKGROUND

Oxygen storage and oxygen concentration systems are used in the industrial gas, health care, and aerospace industries among others. In oxygen storage applications, oxygen capacity drives cost and utility. By designing systems that improve capacity without requiring changes in infrastructure, compression, or usage, an aspect of the current invention creates value. In oxygen concentration systems, power requirements and system form factor drive cost and utility. By designing systems that reduce the power required to separate the components of air while improving system design trade-offs such as form factor, an aspect of the current invention creates value.

It has been recognized that porous materials can be used to reduce the pressure of stored gases. This recognition is based on the concept of gas adsorption, wherein loading a vessel with solid material prior to charging with gas increases gas-solid contact area and distributes pressure more evenly throughout the system. The performance of these systems is tied to the internal surface area and pore uniformity of the solid material, properties that have been studied extensively in adsorbents such as zeolites and activated carbon.

Chang (U.S. Pat. No. 6,656,878) discloses an activated carbon adsorbent for the storage of oxygen gas at cryogenic temperature. The use of low temperature improves system performance, enabling this solution in specialized applications.

There is demand in the field for a system that could increase oxygen storage in high-pressure cylinders without requiring temperature control. Ideally, such a system would reversibly adsorb and desorb oxygen at room temperature, release the majority of its contents above 2 bar, and exhibit low thermal variance.

It has further been recognized that sieve beds selective for one air component over others can be utilized in pressure-swing adsorption (PSA) processes for air fractionation. The performance of these systems, as measured by product recovery given a purity target, is ultimately capped by the characteristics of the employed adsorbent.

Coe et al. (U.S. Pat. No. 5,417,957) teach using a lithium-exchanged zeolite, LiX, for the selection of nitrogen over other components in air. This material has been incorporated in PSA systems for the generation of 88-95% pure oxygen, or less commonly >80% pure nitrogen.

Nitrogen-adsorbing PSA processes are capped in oxygen purity due to the presence of non-adsorbing argon in air. If oxygen-adsorbing systems were used instead, the extract could be delivered as low-argon product. Oxygen is additionally a minor air component, requiring a smaller, lower-power system to process the same flow rate.

Due to material limitations, the design of oxygen-selective adsorption systems for bulk equilibrium separation has been infeasible. Equilibrium oxygen-selective materials bind too strongly, adsorb too little, diffuse too slowly, or otherwise exhibit properties that are not amenable to pressure-swing adsorption systems. The metallic structure of zeolites enables the exploitation of nitrogen's quadrupole moment, but disallows many oxygen-selective chemical mechanisms. Carbon molecular sieves are kinetically selective, but cannot be easily modified for equilibrium selectivity. Cross-linked polymers can embed many motifs, but cannot uptake enough gas for bulk separation applicability.

Munzner et al. (U.S. Pat. No. 3,979,330) teach using a carbon molecular sieve (CMS) to kinetically select oxygen over other components in air. Rather than thermodynamically preferring one gas to another, CMS PSA units exploit differences in diffusion rates between gases in air. These systems are used to produce nitrogen, stripping oxygen from the feed stream. However, the fact that CMS is not equilibrium selective increases the complexity of CMS-based PSA systems, deviating from the ideal Skarstrom-like cycle and increasing power requirements.

Mullhaupt et al. (U.S. Pat. No. 5,945,079) discuss the application of an oxygen binding mechanism known in the art to produce equilibrium oxygen-selective materials. This uses a reversible reaction mechanism embedded in a scaffold that has significantly lower capacity than zeolites, limiting its use in bulk air separation.

There is demand in the field for a high-capacity equilibrium-selective adsorption system for bulk air separation. Preferably, such a system would prefer oxygen to nitrogen, possess mechanical and chemical stability, reversibly adsorb and desorb at ambient conditions and be amenable to existing infrastructure.

SUMMARY

Embodiments of the invention are drawn to (a) adsorption systems for the storage of oxygen gas and oxygen-containing gaseous mixtures, (b) the integration of adsorbents, such as MOFs, into gas delivery systems, enabling a significant increase in delivered storage capacity over existing solutions, and (c) the integration of adsorbents, such as MOFs, into air separation systems, reducing operational power requirements by improving product recovery.

One embodiment relates to a metal-organic framework (MOF) adsorbent, comprising a coordination product of at least one metal ion and at least one multidentate organic ligand. The metal ions and the organic ligands are selected to provide an oxygen capacity of at least 200 g/L measured at 140 bar and 22° C.

Another embodiment relates to a method of using a metal-organic framework (MOF) comprising a coordination product of at least one metal ion and at least one multidentate organic ligand including loading an adsorption vessel with MOF, charging the MOF with oxygen gas or oxygen-containing gaseous mixtures and storing the oxygen gas or oxygen-containing gaseous mixtures in the MOF. The MOF provides an oxygen capacity of at least 200 g/L at 140 bar and 22° C.

Another embodiment relates to a pressure-swing adsorption (PSA) system including at least one adsorption bed filled with an adsorbent, which, on an equilibrium basis, exhibits a selective preference for oxygen over nitrogen greater than 1.4:1 with a capacity greater than 0.60 mmol/g. The adsorbent reversibly desorbs at least 10% of the adsorbed oxygen between 6 and 0.1 bar at 22° C. This is in contrast to CrBTC (J. Am. Chem. Soc. 2010, 132, 7856-7857), which exhibits no measurable desorption in this regime and therefore cannot be used in pressure-swing systems.

Another embodiment relates to method of using a metal-organic framework (MOF) comprising coordination product of at least one metal ion and at least one multidentate organic ligand, involving: loading an adsorption vessel with MOF, charging said vessel with a mixed-component air stream at higher pressure, and discharging said vessel at a lower pressure in a manner that improves the purity of component streams, wherein the MOF provides an oxygen-nitrogen selectivity of at least 1.4:1 or at least 1:2 at 4 bar at 22° C.

One embodiment relates to an oxygen storage system containing an adsorbent with a capacity measured at 140 bar and 22° C. of at least 200 g/L for oxygen gas or oxygen-containing gaseous mixtures.

Another embodiment relates to a pressure swing adsorption (PSA) system, including at least one adsorption bed filled with an adsorbent, which on an equilibrium basis, exhibits a selective preference for oxygen over nitrogen of greater than 1.4:1 with a capacity greater than 0.60 mmol/g, where said adsorbent reversibly desorbs at least 10% of the adsorbed oxygen between 6 to 0.1 bar measured at 22° C.

Another embodiment relates to a method of using a system containing a MOF comprising at least one metal ion and at least one multidentate organic ligand, including filling and storing oxygen in the MOF. The system exhibits a capacity measured at 140 bar and 22° C. of at least 200 g/L for oxygen-containing gaseous mixtures, or an oxygen-nitrogen selectivity of at least 1.4:1 or at least 1:2 with a heavy-component capacity of at least 0.6 mmol/g at 4 bar and 22° C.

BRIEF DESCRIPTION OF THE DRAWINGS

Figure 8:
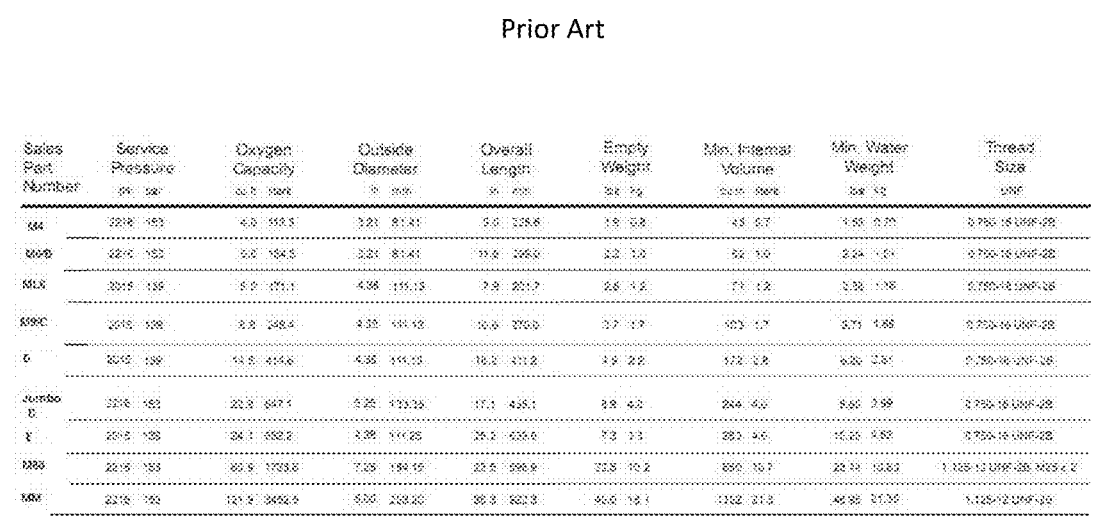

FIG. 8 is list of industry-standard aluminum oxygen storage cylinders used for the storage and delivery of oxygen.

DETAILED DESCRIPTION

Figure 1A:
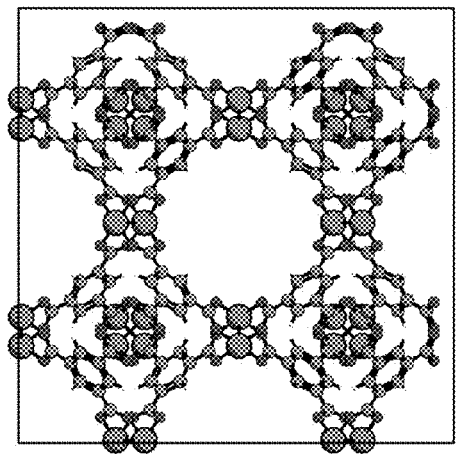
FIGS. 1a-1d are ball-and-stick illustrations of MOFs including (a) CuBTC (b) FeMOF-74, (c) CrMIL-100 and (d) UiO-68.
Figure 1B:
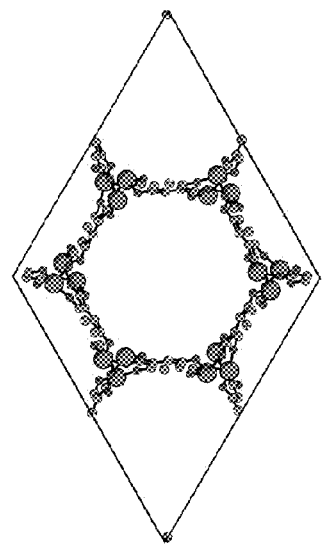
Figure 1C:
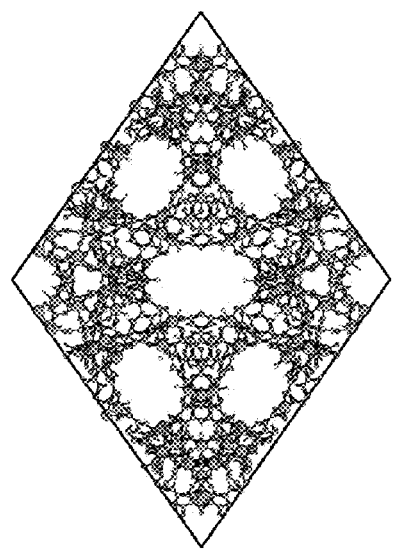
Figure 1D:
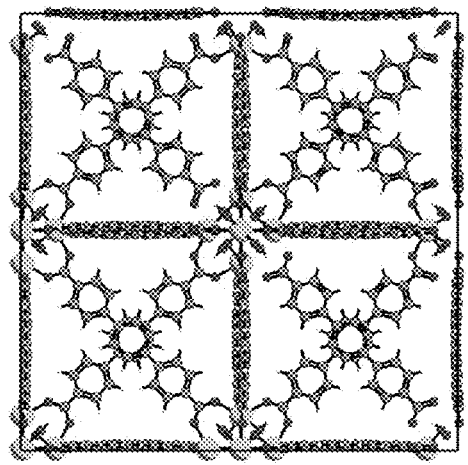

Embodiments of the present invention reduce the cost of oxygen storage and air separation by fundamentally redesigning systems to take advantage of the properties of MOFs. MOFs are an enabling technology for introducing adsorption into high-pressure gas storage, and additionally make available novel chemical mechanisms for air separation processes.

Oxygen of varying purities is used in applications as diverse as home health care, firefighting, coal mining, and metalworking. In many of these applications, oxygen is provided through a delivery network sourced by centralized refineries. The product cost is driven by logistics, which is directly related to the volumetric capacity of the transported storage vessels.

Increased storage density also benefits end users, improving lifetime and reducing change-outs. As an example, patients suffering from chronic obstructive pulmonary disease, or COPD, are commonly prescribed long-term oxygen therapy for symptomatic treatment. Early-stage patients are encouraged to be ambulatory, and require portable oxygen solutions to do so. High-density oxygen storage systems improve the quality of life of COPD patients by increasing breathe time without additionally burdening the user.

Additional oxygen storage benefits both producers and consumers, decreasing costs and improving utility across applications. Therefore, there is demand for products that increase storage density without adding complication.

In current solutions, oxygen is stored either under high pressure in a gas cylinder or at low temperature in a cryogenic storage tank. The latter approach increases storage capacity by liquefying the oxygen, but bleeds product over time to maintain its liquid state. This trait limits its ability to serve many oxygen markets, and gas cylinders still comprise a large portion of the delivered oxygen market.

A preferable solution would increase storage capacity without increasing the system pressure, requiring cryogenic temperature control, or adding new infrastructure. When properly designed, adsorption systems exhibit all of these properties. A useful adsorbent would reversibly charge and discharge gas with a simple pressure driving force, and release most of its contents slightly above atmospheric pressure. When integrated into a cylinder, the system would operate in the same manner as existing gas cylinders—filling under compression and discharging by opening to atmosphere.

For every adsorption system, there exists a pressure where the benefit of the material is equally counteracted by the loss in vacant space. Above this pressure, empty cylinders behave more favorably than adsorption systems. This inflection point is determined by material performance, and is well below oxygen cylinder pressure for zeolites and activated carbon.

Embodiments herein comprise materials capable of providing an oxygen capacity benefit above 140 bar while still being able to desorb the majority of its contents above atmospheric pressure. In this regard, the current embodiments enable adsorption systems in oxygen delivery.

In applications where <99% oxygen is acceptable, on-site generation provides an economically attractive alternative to the cylinder delivery model. At small and medium scales, oxygen is recovered from air using a pressure-swing adsorption (PSA) process. This process involves the use of parallel sieve beds loaded with selective material that fractionates an air feed. The overall process is controlled by a series of actuated valves, which are timed to split out extract and raffinate streams. Ultimately, the performance of the system is linked to the capacity and selectivity of the employed material.

Many small-scale PSA processes in the healthcare and aerospace sectors place a premium on system size and efficiency. A common example is the portable oxygen concentrator (POC), an alternative to delivered oxygen for ambulatory COPD patients. POCs are designed to produce 1-2 SLPM of 88-95% oxygen while minimizing product weight and energy requirements. As the final unit is battery operated and carried by the patient, POC optimizations provide quality-of-life improvements that complement the economics of more efficient systems. This is also true for stationary devices used in the home, where a more efficient separation system would reduce power requirements and associated energy costs.

In these small-scale applications, the material of choice is the lithium-incorporated zeolite LiX. This material has high nitrogen selectivity over oxygen and argon, and possesses properties ideal for PSA incorporation.

Nitrogen-adsorbing PSA processes are capped in oxygen purity due to the presence of non-adsorbing argon in air. If oxygen-adsorbing materials were used instead, the extract could be delivered as low-argon product. Oxygen is additionally a minor air component, requiring less sorbent to process the same flow rate.

No conventional oxygen-selective system has been able to compete with LiX as measured by product recovery. Despite the aforementioned advantages of selecting oxygen over nitrogen, LiX persists as the standard due to its high selectivity, capacity, stability, and lack of commercially viable equilibrium oxygen-selective materials exhibiting reversible adsorption between 1 and 4 bar at 22° C.

The embodiments herein comprise materials capable of using oxygen-selective mechanisms at high adsorptive loading. Embodiments herein additionally comprise materials capable of increasing capacity while competing with the nitrogen selectivity of existing solutions. Especially in the case of oxygen selectivity at high capacity, the embodiments herein enable a step change in PSA oxygen recovery.

Figure 2:
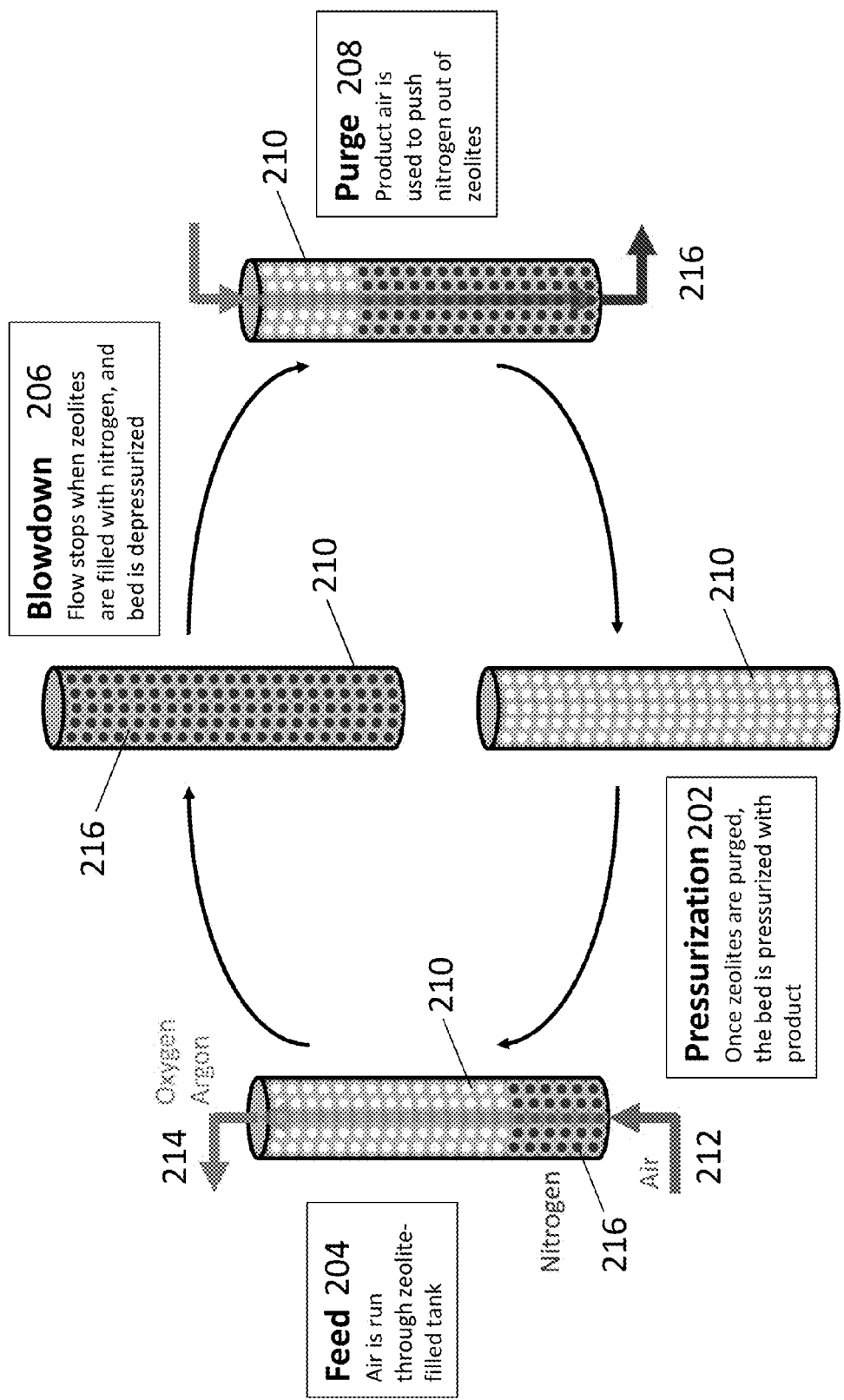
FIG. 2 qualitatively shows the base four-step cycle used in pressure-swing adsorption systems.

FIG. 2 illustrates a PSA method according to an embodiment. Most PSA processes are designed around serving the (non-adsorbed) raffinate 214 as product and the (adsorbed) extract 216 as waste. This is an obvious approach in low-impurity purification, as adsorbing the low-concentration component significantly decreases the amount of adsorbent required. In the use of equilibrium-selective materials, these processes commonly operate on four-step cycles. These steps may be referred to as "pressurization" 202, "feed" 204, "blowdown" 206, and "purge" 208. In the pressurization step 202, a sieve bed 210 is pressurized to or near the feed stream pressure with either raffinate or feed 212. In the feed step 204, feed 212 is then admitted to the bed 210, and pure product 214 is generated downstream. Once the bed 210 nears its maximum extract loading, the feed valve is closed and the bed is opened to low pressure (blowdown step 206). This "blows down" the bed 210, eluding extract 216. The bed 210 is then counter-currently purged with product, further desorbing extract 216 in the purge step 208. Once purged, the cycle restarts. In order to achieve semi-batch operation (i.e. continuous input and output), these processes are generally operated with two or more sieve beds 210 with offset cycles.

Assuming a fixed material, these processes are designed around two variables: purge-to-feed ratio and adsorbent-to-feed ratio. In other words, given a set feed rate, system designers modify the purge flow rate and sieve bed size to optimize the process. Purge flow controls the purity-recovery trade-off, where increasing purge improves purity at the cost of recovery. PSA processes are generally designed to meet a purity target, so the purge flow is often predetermined. The sieve bed size is based off of the mass transfer resistance of the adsorbent, which is a function of the balance between void, macropore, micropore, and film diffusion characteristics. Improving mass transfer allows smaller sieve beds 210 with faster cycle times, decreasing the weight and cost of the process.

Despite the simplicity of the described four-step process, delivering the raffinate 214 as product becomes less favorable when the desired gas is a minor component. These processes require adsorbing most of the gas stream 212, increasing required sieve bed size and impairing product 214 recovery. The alternative is to deliver extract 216 as product, and is often accomplished by adding a fifth step to the PSA cycle. This step, known as "rinse", occurs between feed 204 and blowdown 206 and replaces the interparticle gas by feeding in pure extract 216. This increases the extract purity emitted during the blowdown 206 and purge steps 208, and produces high-pressure feed that can be recycled. In addition to adding a rinse step, these processes may be designed to handle a low-pressure product stream 214. Depending on the extent of purge 208 and the application requirements, some of the product 214 may need to be recompressed before delivery. While this does not affect the product recovery, product compression adds an additional power requirement to the system and must be weighed against other design considerations.

Replacing nitrogen-selective zeolites with high-capacity oxygen-selective adsorbents such as MOFs, and redesigning the PSA process to deliver extract 216 as product improves the efficiency of air separation. Additionally, equilibrium oxygen-selective MOFs can replace the kinetically selective carbon molecular sieves used today and enable nitrogen production at a significantly lower adsorbent-to-feed ratio with a four-step cycle. Finally, equilibrium oxygen-selective and nitrogen-selective MOFs can be used in a stacked bed to produce argon from air with a four-step cycle. These use cases are all embodiments of the current invention, utilizing the same materials and processes to generate different air gases as product. Additional embodiments may include aspects such as incomplete purge, two-bed pressure equalization, void-space rinsing and partial depressurization. Incomplete pressure equalization may be practiced in a commercial oxygen concentrator for medical use by adopting simultaneous pressure equalization and feed-pressurization for pressurizing an adsorption bed. In such a cycle configuration, the extent of equalization during pressure equalization affects process performance.

Figure 3A:
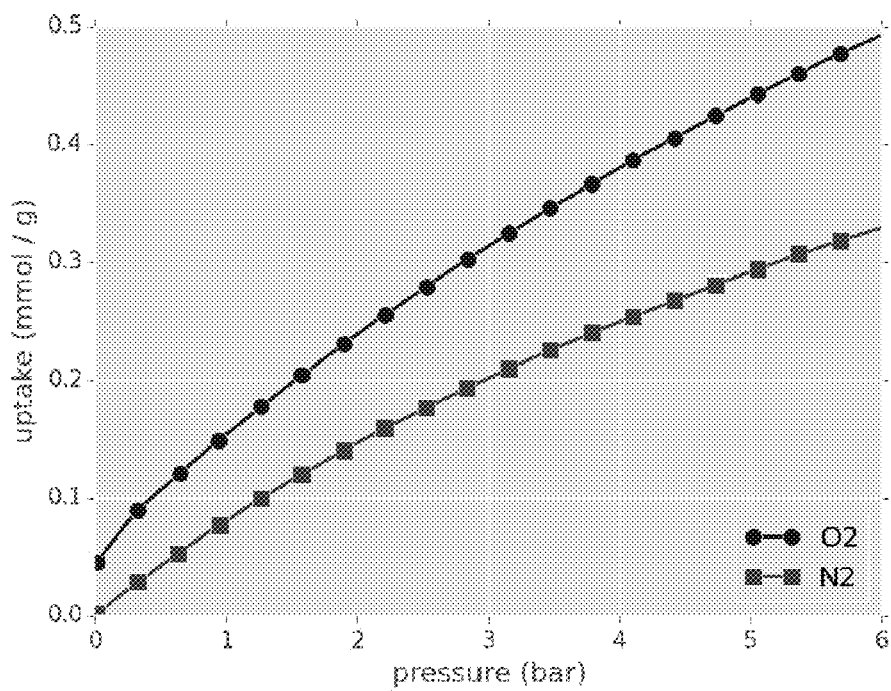
FIGS. 3a and 3b show experimentally measured oxygen and nitrogen uptakes on two MOFs created with iron and bidentate organic ligands in which FIG. 3a comprises iron and fumaric acid and 3b) comprises iron and terephthalic acid.
Figure 3B:
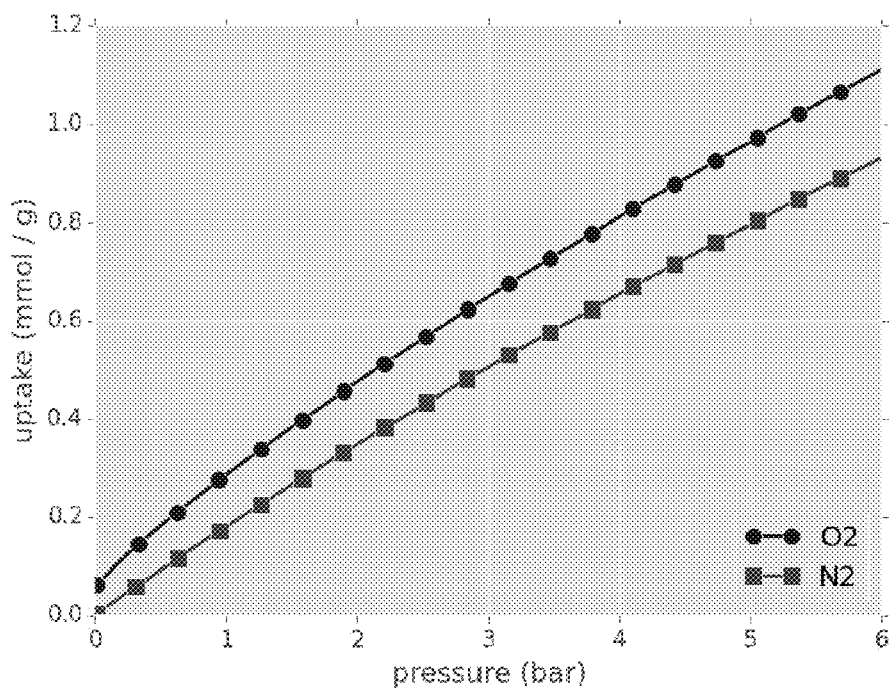

Selectivity is derived from two single-component isotherms using ideal adsorbed solution theory (IAST). Setting the pressure and feed gas composition, IAST predicts the adsorbed gas composition using assumptions and known techniques. Selectivity is dependent on pressure and feed gas composition, so cited values are calculated as the adsorbed composition ratio at 4 bar with a 50/50 oxygen-nitrogen gas phase. Under these conditions, the MOFs relating to FIGS. 3a and 3b have respective oxygen-nitrogen selectivities of 1.9:1 and 1.4:1. IAST is also used to determine total loading at 4 bar with a 50/50 oxygen-nitrogen gas phase, with the MOFs of FIG. 3 exhibiting respective loadings of 0.6 mmol/g and 1.6 mmol/g.

An embodiment relates to the computational design of MOF materials, their simulation for oxygen storage and separation, and the insights generated from simulation results.

An advantage of MOFs over other sorbents is that their structure can be easily estimated knowing only constituent metals and organics. Combined with existing Lennard-Jones theory and modifications thereof, grand canonical monte carlo simulations are able to reliably and rapidly estimate the performance of materials without requiring synthesis. These tools are run in a high-throughput manner, where thousands of MOFs are generated and simulated against gases of interest. The simulation results are then plotted as performance versus material properties. These graphs identify favorable material properties for the application of interest, as well as a filtered list of MOF structures to experimentally validate.

To exclude materials with strong physisorption or chemisorption, the oxygen capacity is calculated as the difference between uptake at 140 bar and 2 bar. This decreases the magnitude of reported capacities, but better reflects material performance in systems.

Simulation results indicate that MOFs with a gravimetric surface area ranging 1,000-14,500 $m^2/g$ and a modal pore size ranging 2-25 Å have favorable performance characteristics for the storage of the following oxygen-containing gases shown in Table 1.

TABLE 1

Targeted oxygen-containing mixtures of gases for MOF storage

| Oxygen | Air | Oxygen/Helium | Oxygen/Helium/Nitrogen |
|---|---|---|---|
| Oxygen/ Hydrogen | Oxygen/ Nitrogen | Oxygen/ Argon | Oxygen/ Neon |

To better understand how structure properties influence capacity, MOFs of varying metal nodes and topologies were simulated for oxygen uptake. This analysis included a family of MOFs with 2-dimensional channels (Co-MOF-74, Fe-MOF-74, and Ni-MOF-74), a family of MOFs containing copper paddlewheels (CuBTC, NU-110, NU-111, and NU-125) and a family of zirconium-based MOFs (UiO-66, UiO-67, and UiO-68), as seen in Table 2.

TABLE 2

Structure-property relationship for oxygen storage and sorption characteristics

| | Surface Area $m^2/g$ | Pore sizes Å | Pore volume cc/g | Oxygen capacity g/L |
|---|---|---|---|---|
| Empty tank | | | | 198 |
| Co-MOF-74 | 1,300 | 9 | 0.60 | 330 |
| Fe-MOF-74 | 1,350 | 9 | 0.63 | 336 |
| Ni-MOF-74 | 1,350 | 9 | 0.61 | 327 |
| CuBTC | 1,900 | 4, 10, 11 | 0.78 | 334 |
| NU-110 | 7,140 | 18, 23, 33 | 4.40 | 279 |
| NU-125 | 3,150 | 11, 15, 16, 24 | 1.29 | 357 |
| NU-111 | 4,930 | 14, 17, 19, 24 | 2.09 | 320 |
| UiO-66 | 1,090 | 7, 10 | 0.44 | 279 |
| UiO-67 | 3,200 | 12, 14 | 0.8 | 337 |
| UiO-68 | 4,300 | 12, 17 | 1.1 | 323 |

The MOF-74 materials exhibit similar gravimetric surface areas (1,300-1,350 $m^2/g$) and pore sizes (9 Å), but differ in their metal nodes. The simulation of these materials returned similar oxygen capacities (229-235 L (STP)/L).

Contrasting MOF-74 materials, the copper paddlewheel MOFs show a wide variation in structural properties. The surface areas of simulated materials ranged from 1,900 to 7,140 $m^2/g$, pore sizes from 4 to 24 Å, and pore volumes from 0.78 to 4.40 cc/g. The resultant simulated deliverable oxygen capacities ranged from 195 to 250 cc/cc. Both surface area and pore volume appear to play important roles in high-pressure oxygen storage. Oxygen deliverable capacities increase with increasing gravimetric surface area and pore volume, as seen with CuBTC (334 g/L, 1,900 $m^2/g$, 0.78 cc/g) and NU-125 (357 g/L, 3,150 $m^2/g$, 1.29 cc/g). However, performance decreases at ultrahigh surface areas, as observed in NU-111 (320 g/L, 4,930 $m^2/g$, and 2.09 cc/g) and NU-110 (279 g/L, 7,140 $m^2/g$, 4.4 cc/g).

The same correlation was observed with the simulated zirconium-based UiO MOF series. An optimal surface area and pore volume was noted with a similar trend: UiO-66 (279 g/L, 1,090 $m^2/g$, 0.44 cc/g), UiO-67 (337 g/L, 3,200 $m^2/g$, 0.8 cc/g) and UiO-68 (323 g/L, 4,300 $m^2/g$, 1.1 cc/g).

FIG. 3 shows an experimentally measured oxygen and nitrogen uptakes on a MOF created with iron and a bidentate organic ligand. As can be seen in FIG. 3, this MOF preferentially adsorbs oxygen to nitrogen.

Figure 4:
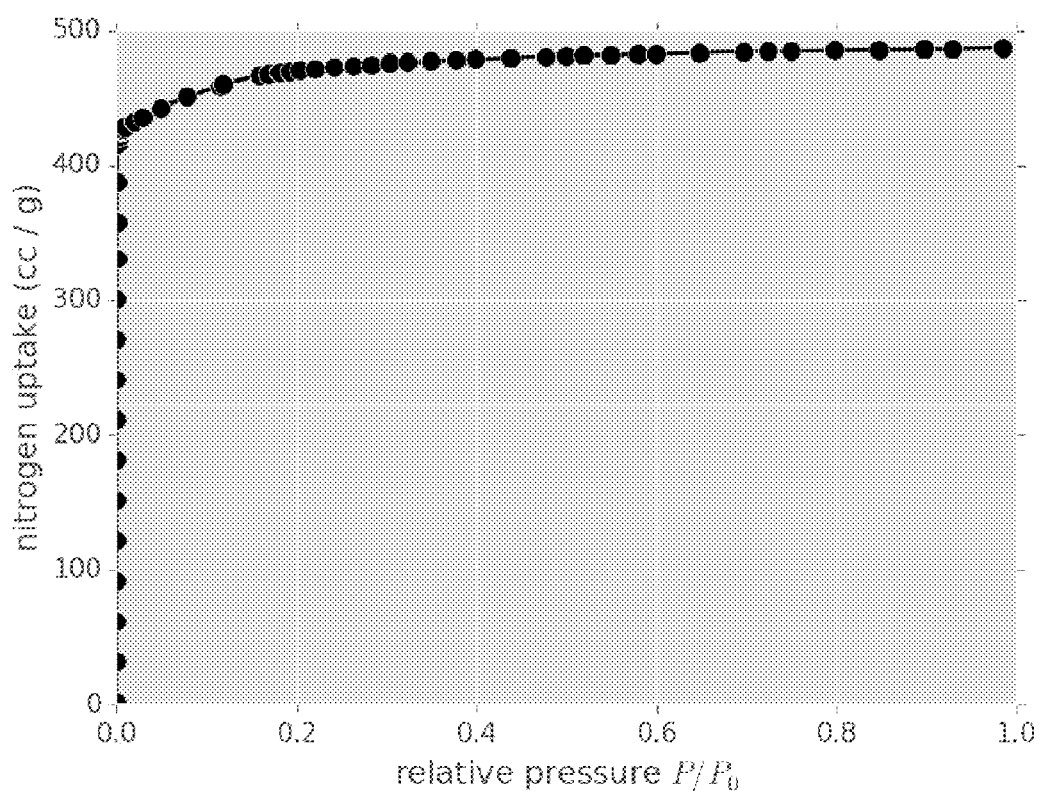
FIG. 4 is an experimentally measured liquid nitrogen isotherm of CuBTC at 77 K and up to 1 bar on an example MOF (closed symbols: adsorption, open symbols: desorption). This data can be fit with Brunauer-Emmett-Teller theory and a gravimetric surface area of approximately 1,900 m$^2$/g can be derived.

FIG. 4 is an experimentally measured liquid nitrogen isotherm of CuBTC at 77 K and up to 1 bar on an example MOF. These data can be fit with Brunauer-Emmett-Teller theory and a gravimetric surface area of approximately 1,900 $m^2/g$ can be derived.

Figure 5:
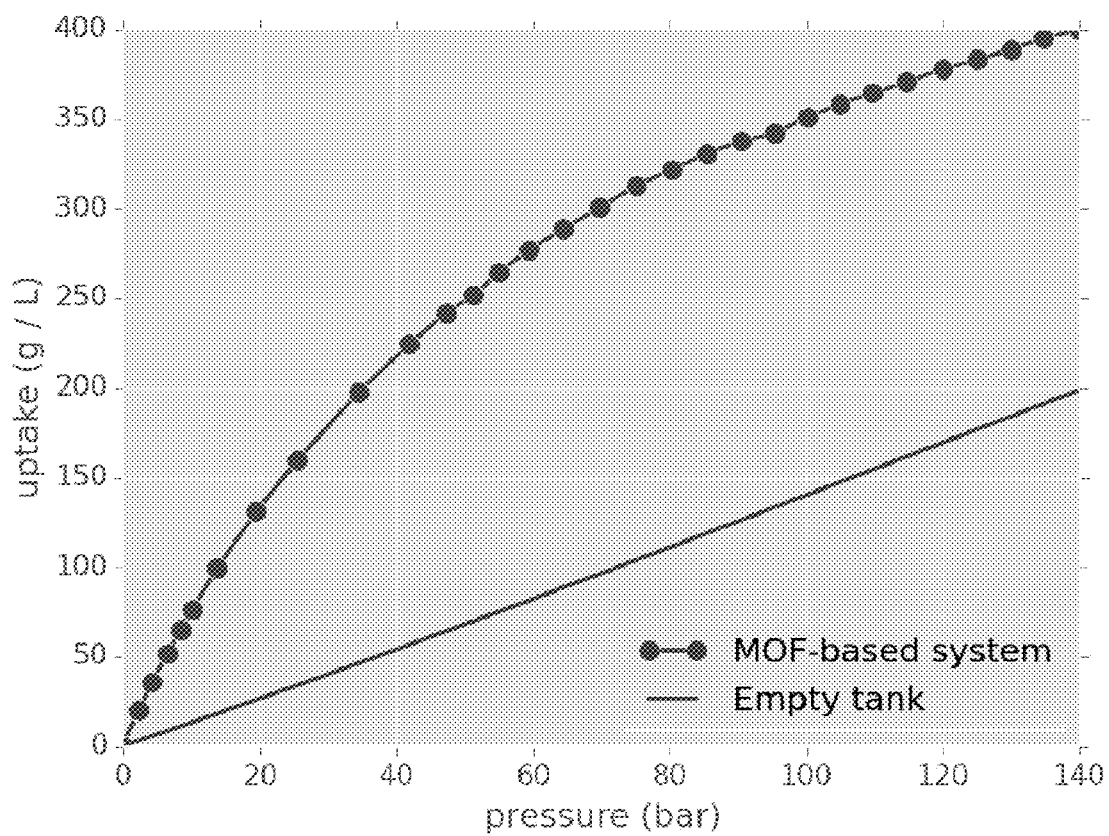
FIG. 5 is an experimentally measured oxygen isotherm of CuBTC measured at 22° C. (closed symbols: adsorption, open symbols: desorption). Overlaid is the capacity of an adsorbent-free vessel at 2,000 psi and 22° C.

The simulation results of CuBTC encouraged experimental validation. CuBTC was activated under vacuum at 150° C. for 5 hours, and an oxygen isotherm up to 140 bar was measured (FIG. 5). The experimentally obtained high-pressure oxygen isotherm agrees with the simulated data for CuBTC, and indicates a storage capacity over double that of an empty vessel. These results were validated in a MOF-filled medical oxygen E cylinder, where tradeoffs between void fraction and capacity followed expected trends with no observed impurity off-gasing.

The same high-throughput simulation techniques were used to predict oxygen-nitrogen selectivity based off of geometric properties. These results illustrated that materials with pore sizes less than 5 Å show remarkable oxygen selectivity in cases where uptake is possible. However, structures with small pore sizes generally have unfavorable uptakes and diffusion characteristics, so these results must be balanced against practical considerations.

On top of geometric effects, electrostatic interactions also play a role in the selective adsorption of air components. MOFs are capable of emulating the mechanisms in zeolites, incorporating cations to preferentially adsorb nitrogen. This provides a performance baseline, where existing motifs can be incorporated into high-surface-area materials to gain capacity while maintaining selectivity.

MOFs can additionally embed oxygen-selective motifs directly into its structure, opening up a wide range of both metal and organic mechanisms. For example, cobalt-embedded organics (e.g. salcomine, porphyrin) are known to preferentially adsorb oxygen. Previous work has attempted to load variations of this motif into microporous activated carbon. While selective for oxygen, these materials do not possess the capacity necessary for bulk air separation. Structurally embedding organics into MOFs removes the bulk gas limitation, generating structures with high functional site density and high capacity. In particular, a novel MOF synthesized with a ditopic salcomine analog has substantially higher functional cobalt loading than conventional solutions.

In addition to known cobalt interactions, simulations suggest that oxygen selection by nitrogen repulsion is another useful mechanism. By creating MOFs from organics with amines, nitrogen-containing heterocycles, or halogens, nitrogen gas physisorption is energetically discouraged. This approach requires highly functionalized organics to provide competitive selectivity, but does offer multiple additional novel MOFs for air separation. An example of a MOF that exploits this mechanism is Cu—$SiF_6$—Py, a structure comprised of silicon hexafluoride, pyrazine, and copper. This framework has small pores and a large concentration of accessible halogens, both of which aid in nitrogen repulsion.

A less understood mechanism available to MOFs involves "open metal sites", or accessible metals in the framework that provide electrostatic interaction. Surprisingly, metals bound as framework building blocks often behave very differently than their unbound analogs. For example, Co-MOF-74 was found to be nitrogen selective, even though cobalt is a commonly cited oxygen-selective metal. These interactions are highly unexpected, and can be utilized in complementing the organic mechanisms discussed previously.

Figure 6A:
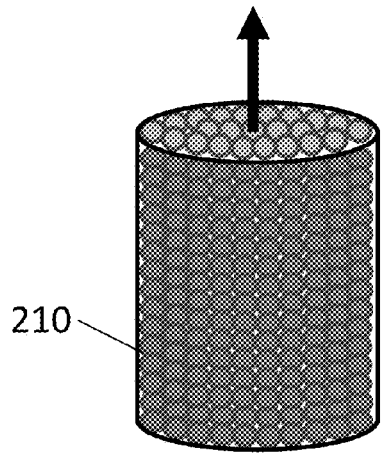
FIGS. 6a and 6b show two packing strategies for adsorbent-based oxygen storage systems: 6(a) mechanically formed MOF pellets and 6(b) monolithic MOF discs.
Figure 6B:
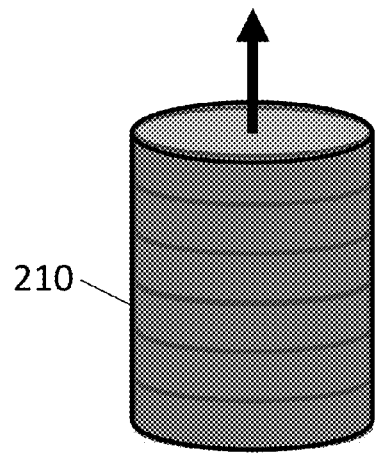

FIGS. 6a and 6b show two packing strategies for adsorbent-based oxygen storage systems: 6(a) mechanically formed MOF pellets are loaded easily, but reduce storage by having an interparticle void fraction of 35-40% and 6(b) monolithic solutions such as MOF disc pellets can be used to decrease void fraction, but are more costly and impair mass transfer.

Figure 7A:
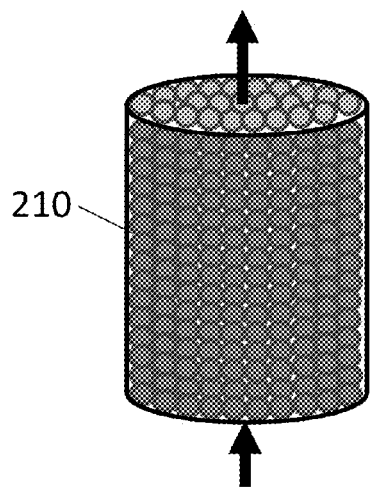
FIGS. 7a and 7b show a sieve bed and a schematic of a pressure-swing adsorption apparatus, respectively.
Figure 7B:
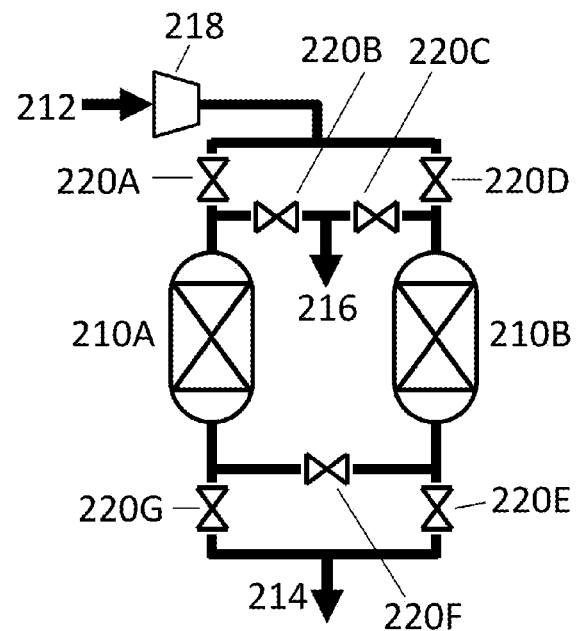

FIGS. 7a and 7b show a sieve bed and a schematic side cross-section of a pressure-swing adsorption apparatus, respectively. In FIG. 7(a) agglomerated MOF beads are loaded into a sieve bed. Here, mass transfer characteristics play a role in determining agglomeration parameters. FIG. 7(b) is a schematic illustration of a cross-section of a pressure-swing apparatus according to an embodiment. Valving controls pressurization, feed, blowdown, purge, and optional rinse steps to the beds similar to that illustrate in FIG. 2. In an embodiment, an input gas stream 212 is supplied to the apparatus with a pump or blower 218. Valve 220A is opened to allow the stream to flow into the first sieve bed 210A packed with a first MOF. Alternatively, Valve 220A is closed and Valve 220F is opened, allowing the input gas stream 212 to flow into the second sieve bed 210B packed with a second MOF. The second MOF may be the same as the first MOF depending on whether to separations are desired. If the first and second sieve beds 210A, 210B, the two sieve beds may run at offset cycle times to enable semi-batch unit operation. That is, the input gas stream 212 is first sent to the first sieve bed 210A. The extract 216 adsorbs on the MOF in the first sieve bed 210 and the product 214 is passed through valve 220G and removed from the apparatus. When the MOF is saturated with product 214, valves 220A and 220G are closed. Valve 220B is opened and the extract 216 is purged. While the extract 216 is being purged from the first sieve bed 210A, valves 220F and 220E are opened. The input gas stream is directed toward the second sieve bed 210B. The extract 216 adsorbs in the second sieve bed 210B while the product passed through valve 220E and out of the apparatus. When, the MOF in the second sieve bed 210B saturates, valves 220E and 220D are closed and valve 220C is opened to allow purging of the extract 216 from the second sieve bed 210B. The process is then repeated as desired. Optionally, the system may include additional beds, a vacuum pump, or a product storage tank.

An embodiment relates to metal-organic framework (MOF) adsorbent including a coordination product of at least one metal ion and at least one multidentate organic ligand. The metal ions and the organic ligands are selected to provide an oxygen capacity of at least 200 g/L measured at 140 bar and 22° C. In an aspect, the MOF exhibits a gravimetric surface area between 1,000 and 14,500 $m^2/g$, a pore volume between 1 and 3 cc/g and an average micropore size between 2 Å and 25 Å. In another aspect, the MOF comprises a gravimetric surface area between 1,000 and 7,000 $m^2/g$, a pore volume between 0.44 and 4.4 cc/g and an average micropore size between 5 Å and 25 Å. In another aspect, the capacity of oxygen at 140 bar and 22° C. is between 200 and 650 g/L. In another aspect, the capacity of oxygen at 140 bar and 22° C. is between 200 and 375 g/L. In another aspect, the MOF is mechanically formed into a shape having a diameter between 0.1 and 10 mm.

An embodiment relates to a method of using a metal-organic framework (MOF) comprising a coordination product of at least one metal ion and at least one multidentate organic ligand including loading an adsorption vessel with MOF, charging the MOF with oxygen gas or oxygen-containing gaseous mixtures and storing the oxygen gas or oxygen-containing gaseous mixtures in the MOF. The MOF provides an oxygen capacity of at least 200 g/L at 140 bar and 22° C. In an aspect, the MOF exhibits a gravimetric surface area between 1,000 and 14,500 $m^2/g$, a pore volume between 1 and 3 cc/g and an average micropore size between 2 Å and 25 Å. In another aspect, the MOF comprises a gravimetric surface area between 1,000 and 7,000 $m^2/g$, a pore volume between 0.44 and 4.4 cc/g and an average micropore size between 5 Å and 25 Å. In another aspect, the capacity of oxygen at 2,000 psi and 22° C. is between 200 and 650 g/L. In another aspect, the capacity of oxygen at 2,000 psi and 22° C. is between 200 and 375 g/L. In another aspect, the MOF is mechanically formed into a shape having a diameter between 0.1 and 10 mm.

An embodiment relates to a pressure-swing adsorption (PSA) system including at least one adsorption bed filled with an adsorbent, which, on an equilibrium basis, exhibits a selective preference for oxygen over nitrogen greater than 1.4:1 with a capacity greater than 0.60 mmol/g. The adsorbent reversibly desorbs at least 10% of the adsorbed oxygen between 6 and 0.1 bar at 22° C. In an aspect, the system is configured to deliver from 0.10 SLPM to 10,000 SLPM of oxygen exceeding 88% purity.

Another embodiment relates to a metal-organic framework (MOF) adsorbent comprising a coordination product of at least one metal ion and at least one multidentate organic ligand, wherein the metal ions and the organic ligands are selected to provide an oxygen-nitrogen selectivity of at least 1.4:1 In an aspect, the metal ions and the organic ligands are selected to provide an oxygen-nitrogen selectivity of at least 1:2 at 4 bar at 22° C. In an aspect, the metal ion is selected from $Co^{2+}$, $Fe^{2+}$, $Ni^{2+}$, $Cu^{2+}$, $Zr^{4+}$, $Mn^{3+}$, $Mg^{2+}$ and combinations thereof. In another aspect, the MOF exhibits a gravimetric surface area between 1,000 and 14,500 $m^2/g$, a pore volume between 1 and 3 cc/g, and an average micropore size between 2 Å and 25 Å. In another aspect, the MOF comprises a gravimetric surface area between 1,000 and 7,000 $m^2/g$, a pore volume between 0.44 and 4.4 cc/g, and an average micropore size between 5 Å and 25 Å. In another aspect, the MOF contains charged anions and cations distributed throughout the MOF. In another aspect, the MOF is formed into a shape comprising a binder or embedded into a macroporous scaffold, having a macropore distribution of 500 Å to 10,000 Å. In another aspect, the metal component is iron and the organic component is fumaric acid. In another aspect, the ligand has a carbon-to-nitrogen ratio of 6:1 or lower.

Another embodiment relates to a method of using a metal-organic framework (MOF) including coordination product of at least one metal ion and at least one multidentate organic ligand, comprising loading an adsorption vessel with MOF, charging said vessel with a mixed-component air stream at high pressure and discharging the vessel at a lower pressure in a manner that improves the purity of component streams. The MOF provides an oxygen-nitrogen selectivity of at least 1.4:1 or at least 1:2 at 4 bar at 22° C. In an aspect, the metal ion is selected from $Co^{2+}$, $Fe^{2+}$, $N^{2+}$, $Cu^{2+}$, $Zr^{4+}$, $Mn^{3+}$, $Mg^{2+}$ and combinations thereof. In another aspect, the MOF exhibits a gravimetric surface area between 1,000 and 14,500 $m^2/g$, a pore volume between 1 and 3 cc/g, and an average micropore size between 2 Å and 25 Å. In another aspect, the MOF comprises a gravimetric surface area between 1,000 and 7,000 $m^2/g$, a pore volume between 0.44 and 4.4 cc/g, and an average micropore size between 5 Å and 25 Å. In another aspect, the MOF contains charged anions and cations distributed throughout the MOF. In another aspect, the MOF is formed into a shape through the use of a binder or embedded into a macroporous scaffold, having a macropore distribution of 500 Å to 10,000 Å.

In another aspect, the oxygen recovery is greater than 30% at 90% purity. In another aspect, the oxygen recovery is greater than 40% at 90% purity. In another aspect, the target oxygen flow rate is 0.10-10,000 SLPM and the target oxygen purity is 88-95%. In another aspect, the feed is pressurized to 15-60 psig. In another aspect, the desired product gas is nitrogen. In another aspect, the desired product gas is argon.

The synthesis of some discussed MOFs is elaborated upon in the examples presented below.

Example 1

Synthesis of CuBTC

To a solution of trimesic acid (13.6 g, 65 mmol) dissolved in a mixture of ethanol (600 mL) and N,N-dimethylformamide (40 mL) in a 1.5 L screw cap jar was added a solution of $Cu(NO_3)_2 \cdot 3H_2O$ (48.3 g, 20 mmol) in water (600 mL). The resulting mixture was placed in an oven at 80° C. After 20 hours, the light-blue crystalline powder was collected by filtration, washed with methanol (200 mL) and heated at 150° C. for 12 hours to remove residual solvent. The desired product was isolated as a dark-blue crystalline powder. Yield=14.3 g (73%).

Example 2

Synthesis of Co-MOF-74

To a solid mixture of $Co(NO_3)_2 \cdot 6H_2O$ (10.7 g, 37 mmol) and 2,5-dihydroxyterephthalic acid (2.18 g, 11 mmol) in a 1 L screw cap jar was added a 1:1:1 (v/v/v) mixture of N,N-dimethylformamide-ethanol-water (900 mL). The suspension was mixed until homogeneous. The reaction jar was capped and placed in an oven at 100° C. After 24 hours, the sample was removed from the oven and cool to room temperature. The red-orange crystalline powder was collected by filtration, washed with methanol (300 mL) and heated at 250° C. for 12 hours to remove residual solvent. Yield=2.14 g (43%).

Example 3

Synthesis of Cu—$SiF_6$—Py

Pyrazine (10.4 g, 0.130 mol) in methanol (200 mL) was carefully layered onto a solution of $CuSiF6 \cdot xH_2O$ (12.5 g, 0.06 mol) in methanol (200 mL). The solution was left for 24 h at room temperature, filtered and washed with fresh methanol. The resulted solid was heated at 120° C. to remove residual solvent. Yield=18.6 g (88%)

Example 4

Synthesis of UiO-66

To a 1 L screw cap jar charged with $ZrCl_4$ (25.0 g, 107 mmol) was added a mixture of N,N-dimethylformamide (300 mL) and concentrated hydrochloric acid (40 mL). Terephthalic acid (24.8 g, 149 mmol) was added in one portion. The resulting mixture was diluted with N,N-dimethylformamide (300 mL) and placed in an oven at 80° C. After 12 hours, the mixture was cooled to room temperature. The white crystalline powder was collected by filtration, washed with N,N-dimethylformamide (100 mL), methanol (300 mL) and heated at 150° C. for 12 hours to remove residual solvent. Yield=28.6 g (82%).

Example 5

Synthesis of NU-125

In a 250 mL screw cap jar, 5,5',5"-(4,4',4"-(benzene-1,3, 5-triyl)tris(1H-1,2,3-triazole-4,1-diyl)triisophthalic acid (2.00 g, 2.60 mmol) was suspended in DMF (200 mL) and sonicated for 30 minutes. $Cu(NO_3)_2 \cdot 2.5H_2O$ (5.0 g, 21.4 mmol) was added followed by $HBF_4$ 50% w/w aqueous solution (4 mL). This mixture was heated at 80° C. for 18 h, cooled to room temperature, filtered, washed with fresh DMF, and soaked in fresh acetone for 2 days. The solid was filtered and activated at 110° C. to remove residual solvent.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of using a metal-organic framework (MOF) comprising a coordination product of at least one metal ion and at least one multidentate organic ligand, comprising:
    loading an adsorption vessel with MOF;
    charging the MOF with oxygen gas or oxygen-containing gaseous mixtures; and
    storing the oxygen gas or oxygen-containing gaseous mixtures in the MOF,
    wherein the MOF provides an oxygen capacity of at least 200 g/L at 140 bar and 22° C.

2. The method of claim 1, wherein the MOF exhibits a gravimetric surface area between 600 and 14,500 $m^2/g$, a pore volume between 1 and 3 cc/g and an average micropore size between 2 Å and 25 Å.

3. The method of claim 1, wherein the MOF comprises a gravimetric surface area between 600 and 7,000 $m^2/g$, a pore volume between 0.44 and 4.4 cc/g and an average micropore size between 5 Å and 25 Å.

4. The method of claim 1, wherein the capacity of oxygen at 2,000 psi and 22° C. is between 200 and 650 g/L.

5. The method of claim 1, wherein the capacity of oxygen at 2,000 psi and 22° C. is between 200 and 375 g/L.

6. The method of claim 1, wherein the MOF is mechanically formed into a shape having a diameter between 0.1 and 10 mm.

7. A method of using a metal-organic framework (MOF) comprising coordination product of at least one metal ion and at least one multidentate organic ligand, comprising: loading an adsorption vessel with MOF, charging said vessel with a mixed-component air stream at high pressure and discharging the air stream from said vessel at a lower pressure, wherein the MOF provides an oxygen-nitrogen selectivity of at least 1.4:1 or at least 1:2 at 4 bar at 22° C.

8. The method of claim 7, wherein the metal ion is selected from $Co^{2+}$, $Fe^{2+}$, $Ni^{2+}$, $Cu^{2+}$, $Zr^{4+}$, $Mn^{3+}$, $Mg^{2+}$, and combinations thereof.

9. The method of claim 7, wherein the MOF exhibits a gravimetric surface area between 600 and 14,500 $m^2/g$, a pore volume between 1 and 3 cc/g, and an average micropore size between 2 Å and 25 Å.

10. The method of claim 7, wherein the MOF comprises a gravimetric surface area between 600 and 7,000 $m^2/g$, a pore volume between 0.44 and 4.4 cc/g, and an average micropore size between 5 Å and 25 Å.

11. The method of claim 7, wherein the MOF contains charged anions and cations distributed throughout the MOF.

12. The method of claim 7, wherein the MOF is formed into a shape through the use of a binder or embedded into a macroporous scaffold, having a macropore distribution of 500 Å to 10,000 Å.

13. The method of claim 7, wherein the oxygen recovery is greater than 30% at 90% purity.

14. The method of claim 7, wherein the oxygen recovery is greater than 40% at 90% purity.

15. The method of claim 7, wherein the target oxygen flow rate is 0.10-10,000 SLPM and the target oxygen purity is 88-95%.

16. The method of claim 7, where the feed is pressurized to 15-60 psig.

17. The method of claim 7, where the desired product gas is nitrogen.

18. The method of claim 7, wherein the desired product gas is argon.

19. The method of claim 18, wherein the method comprises a first stage comprising adsorbing one of nitrogen or oxygen in a first MOF in a first vessel followed by second stage of adsorbing the other of nitrogen or oxygen in a second MOF in a second vessel.

20. The method of claim 7, further comprising storing the air stream in the MOF.

* * * * *